US009396072B2

(12) United States Patent
Sorokin et al.

(10) Patent No.: US 9,396,072 B2
(45) Date of Patent: Jul. 19, 2016

(54) DELIVERY WITH RECONCILIATION ON CLIENT SIDE

(75) Inventors: Konstantin Sorokin, Antibes (FR); Huong-Ly Mai, Nice (FR); Sarah Prioux, Grasse (FR); Herve Braganti, Nice (FR); Eric Habermacher, Cannes la Bocca (FR); Annick Whitfield, Valbonne (FR)

(73) Assignee: AMADEUS S.A.S., Biot (FR)

( * ) Notice: Subject to any disclaimer, the term of this patent is extended or adjusted under 35 U.S.C. 154(b) by 390 days.

(21) Appl. No.: 13/500,672

(22) PCT Filed: Oct. 11, 2010

(86) PCT No.: PCT/EP2010/006186
§ 371 (c)(1),
(2), (4) Date: Aug. 27, 2012

(87) PCT Pub. No.: WO2011/042203
PCT Pub. Date: Apr. 14, 2011

(65) Prior Publication Data
US 2012/0324283 A1 Dec. 20, 2012

(30) Foreign Application Priority Data

Oct. 9, 2009 (EP) .................................... 09305960

(51) Int. Cl.
*G06F 11/00* (2006.01)
*G06F 11/14* (2006.01)
*G06F 17/30* (2006.01)

(52) U.S. Cl.
CPC ...... *G06F 11/1443* (2013.01); *G06F 17/30575* (2013.01)

(58) Field of Classification Search
CPC ........... G06F 17/3048; G06Q 30/0281; G06Q 30/0609; G06Q 30/02; G06Q 30/087
USPC ....................... 705/35; 714/55, 715, 797, 703
See application file for complete search history.

(56) References Cited

U.S. PATENT DOCUMENTS 7,865,420 B1 * 1/2011 Daman et al. .................... 705/37
8,301,694 B2 * 10/2012 Ittah et al. ...................... 709/203
(Continued)

FOREIGN PATENT DOCUMENTS

CN          1996855 A        7/2007

OTHER PUBLICATIONS

XP-002568852, "Time Machine Acting Up (Again)", Feb. 3, 2009, forums.macosxhints.com, 4 pgs.
(Continued)

*Primary Examiner* — Bryce Bonzo
*Assistant Examiner* — Jeison C Arcos
(74) *Attorney, Agent, or Firm* — Thompson Hine LLP

(57) ABSTRACT

The invention relates to a system for data synchronization between two or more computer terminals including, at least one client terminal, a server terminal, a communication network connecting said client and server terminals, a data string being created on said client terminal, said client terminal being configured to send the data string to the server terminal for synchronization between the two terminals, characterized in that upon synchronization failure, reconciliation data with the latest synchronization information including said data string, is configured to be stored in a database on the client terminal and resent later according to a retry counter.

9 Claims, 3 Drawing Sheets

(56) References Cited

U.S. PATENT DOCUMENTS

Figure 1:
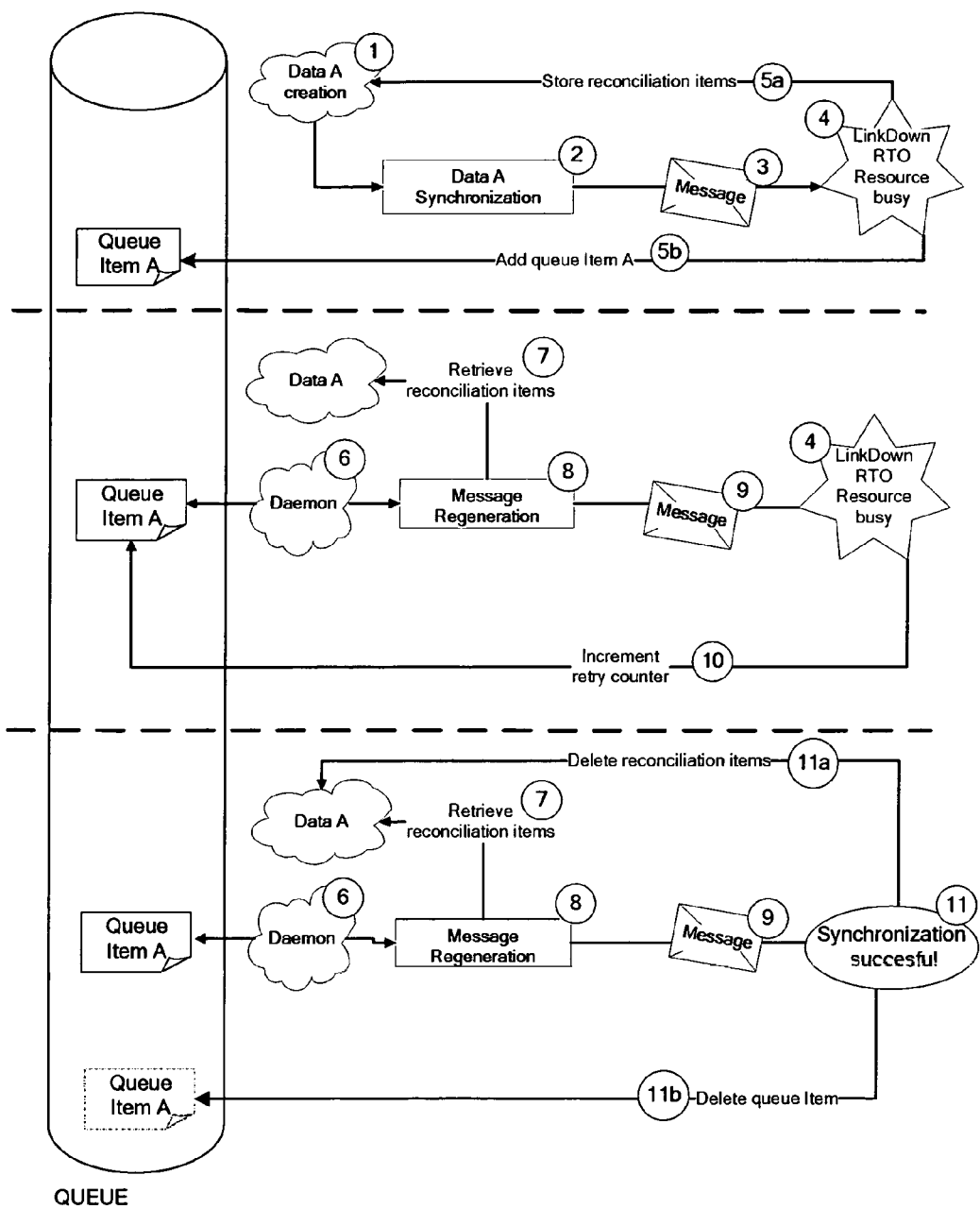

| | | | |
|---|---|---|---|
| 2002/0061012 A1* | 5/2002 | Thi et al. | 370/352 |
| 2002/0188486 A1* | 12/2002 | Gil et al. | 705/7 |
| 2003/0140007 A1* | 7/2003 | Kramer et al. | 705/40 |
| 2003/0177044 A1 | 9/2003 | Sokel et al. | |
| 2003/0189094 A1* | 10/2003 | Trabitz | 235/385 |
| 2007/0025347 A1* | 2/2007 | Cohen et al. | 370/389 |
| 2007/0067354 A1 | 3/2007 | Mullender et al. | |
| 2008/0091480 A1* | 4/2008 | Geoghegan et al. | 705/5 |
| 2008/0208806 A1* | 8/2008 | Dalfo et al. | 707/3 |
| 2008/0229329 A1* | 9/2008 | Ayres | G06F 9/546 719/314 |
| 2008/0307019 A1 | 12/2008 | Weiss et al. | 707/204 |
| 2009/0144341 A1 | 6/2009 | Hauck et al. | 707/202 |
| 2009/0171679 A1 | 7/2009 | Salgado et al. | 705/1 |
| 2011/0145087 A1* | 6/2011 | Daman et al. | 705/26.3 |
| 2012/0239620 A1* | 9/2012 | Masini et al. | 707/634 |
| 2012/0239724 A1* | 9/2012 | Masini et al. | 709/202 |

OTHER PUBLICATIONS

XP-002568851, White, Kevin M., "Mac OS X Support Essentials—Das offizielle Handbuch zu Mac OS X 10.5 fur Administratoren, Help Desk and Support", Aug. 28, 2008, 1 pg.

XP-002568853, Schneider, Kevin A., et al., "Mining a Software Developer's Local Interaction History", May 25, 2004, www.cs.usask.ca/homepages/faculty/kas/papers/MSR_2004_2004_kas.pdf, 5 pgs.

XP-002568854, "Archiving Data", Feb. 16, 2010, symantec.com, 2 pgs.

IP Australia, Examination Report issued in Patent Application No. 2010305653 dated Aug. 7, 2014.

Chinese Patent Office, Official Action issued in application No. 201080052677 dated Apr. 30, 2014.

European Patent Office, European Search Report issued in application No. 09 30 5960 dated Mar. 3, 2010.

European Patent Office, Official Action issued in application No. 10 770 712.7 dated Mar. 18, 2013.

Anonymous: "SVN Auto Commit Bash Script", May 15, 2009, pp. 1-2, XP055055481, retrieved from the Internet: URL:http://www.dzone.com/snippets/svn-auto-commit-bash-script [retrieved on Mar. 6, 2013.

Anonymous: "Oracle Internet Directory Administrator's Guide Release 9.0.2-29 Directory Synchronization", 2002, pp. 1011, XP55055612, retrieved from the Internet: URL:http://www.di.unipi.it/~ghelli/didattica/bdldoc/A97329_03/manage.902/a95192/odip_agents.htm [retrieved on Mar. 7, 2013.

Anonymous: "Apache Subversion", Sep. 25, 2009, pp. 1-4, XP055055498, retrieved from the Internet: URL:http://en.wikipedia.org/w/index.php?title=Apache_Subversion&oldid=31622771 [retrieved on Mar. 6, 2013].

European Patent Office, International Search Report issued in International application No. PCT/EP2010/006186 dated Jan. 25, 2011.

IP Australia, Patent Examination Report No. 2 issued in corresponding Application No. 2010305653, dated Jun. 26, 2015, 5 pages.

\* cited by examiner

DELIVERY WITH RECONCILIATION ON CLIENT SIDE

The present invention relates to a data synchronization system between terminals, namely, client terminals and server terminals. In more specific terms, the present invention relates to a data synchronization system between a reservation system RS and an Airline Inventory System AIS. The present invention further relates to a method of data synchronization between these terminals.

The term terminal used in this application should be interpreted by its broadest definition, comprising any computing device or any entrance or exit node for input or output.

As an example of a reservation system, let's consider Amadeus Reservation System that provides a traveler with a combined view of possible travel solutions from one point to another. The chosen travel is sent by a reservation system to a corresponding airline. The reservation system further provides the confirmation of the booking and stores passenger data in a dedicated data string called Passenger Name Record (PNR) or Structured Booking Record (SBR). Thus such system has passenger oriented architecture.

AIS is a system that is dedicated to store and process flight information of an airline. Hence it has a flight and date oriented architecture. The communication between both systems is done through an on-line link using EDIFACT messages (Electronic Data Interchange For Administration, Commerce and Transport) on every transaction on the itinerary data or passenger data on the reservation system.

A number of RSs can be connected on-line to a single airline inventory system and thereby representing multiple clients on a single server, where RSs are considered clients and AIS the server.

AIS should be notified instantly each time a creation or modification of a booking gets committed. The key information that should be communicated to AIS is:
  flight related information
  overall trip related information
  passenger related information
  special service requests that are done by a passenger On such notifications, AIS may provide supplementary data in the response that corresponds to a booking. This information is stored on the client terminal for passenger notification.

The same booking can be modified several times in a short period of time generating high traffic between both systems which may restrict the performance of the Airline Inventory System. This may lead to an on-line link disruption, which results in a loss of synchronization between the systems.

Thus a powerful mechanism should be put in place between the systems to guarantee correct booking synchronization. Such mechanisms are implemented on a server terminal and thereby contributing to their complexity and increase the traffic between the systems.

When data synchronization between a client and a server is done through on-line links, the message exchange can fail because of time out, link down issue or other possible errors (resource busy on server side, data not yet available on server side . . . ). The synchronization information needs to be resent later.

The objective of invention is to assure synchronization between the systems, while reducing complexity from the server terminal without important traffic increase between the systems.

To solve said problem of complexity while assuring synchronization between the systems, the invention provides a system where all synchronization responsibilities between two systems are moved to a client side only. Client guarantees to a server that it sends the most recent booking image with all actions that have been taken since the last successful synchronization between two systems on a concerned booking.

One and only one client can be a master of a booking thus it Is aware of all modifications that are subject to synchronization with a server.

To move responsibilities to a client it is necessary to
  Have a dedicated storage for each modification done on a particular booking.
  Define the rules that express the importance of each type of modification and their interactions.
  Allow to implement a reconciliation process on a client side for all modifications that were not previously synchronized.

Thus enabling complexity reduction on a server side without any increase of traffic between two systems.

To solve the technical problem above, according to an embodiment, the present invention provides a system for data synchronization between two or more computer terminals comprising, at least one client terminal, a server terminal, a communication network connecting said client and server terminals, a data string being created on said client terminal, said client terminal being configured to send the data string to the server terminal for synchronization between the two terminals, characterized in that upon synchronization failure, reconciliation data with the latest synchronization information including said data string, is configured to be stored in a database on the client terminal and resent later.

According to another embodiment, the present invention also describes a method for data synchronization for a system as already described above where a successful synchronization is reached without subsequent modification of the reconciliation data includes the steps of:
  Creating a new or modifying an existing data string on the client terminal
  Triggering the synchronization process
  Generating a synchronization message
  Synchronization failing
  Reconciliation information being stored in a database on the client terminal
  Adding a queue item in the queue
  The daemon determining if the queue item is eligible for synchronization
  Retrieving the reconciliation information
  Regenerating the previous message
  Incrementing a retry counter
  Synchronizing successfully
  Removing the reconciliation data
  Deleting the queue item.

Another object of the present invention is a method for data synchronization for a system as already described above where a successful synchronization with subsequent modification of the reconciliation data includes the following steps performed with at least one data processor:
  Creating a new or modifying an existing data string on the client terminal
  Triggering the synchronization process
  Generating a synchronization message
  Synchronization failing
  Reconciliation information being stored in a database on the client terminal
  Said data string subsequent modification
  Reconciling the reconciliation item with the current data
  Regenerating the synchronization message containing updated reconciliation information
  Incrementing a retry counter Synchronizing successfully Removing the reconciliation data Deleting the queue item.

The invention also relates to a method for data synchronization for a system as already described above where an unsuccessful synchronization without subsequent modification of the reconciliation data includes the following steps performed with at least one data processor:

Creating a new or modifying an existing data string on the client terminal

Triggering the synchronization process

Generating a synchronization message

Synchronization failing

Reconciliation information being stored in a database on the client terminal

Adding a queue item in the queue

The daemon determining if the queue item is eligible for synchronization

Retrieving the reconciliation information

Regenerating the previous message

Incrementing a retry counter

Reaching the maximum number of retries

Another subject matter of the present invention is a method as set forth in any one of the two preceding paragraphs, where the method is performed as a result of execution of computer software by at least one data processor, the computer software being stored in a non-transitory computer-readable memory medium.

Another subject matter of the present invention is a computer program product stored on a non-transitory computer readable storage medium, comprising computer readable code means for causing at least one computer to operate the method according to any one of the three preceding paragraphs.

A preferred embodiment of the invention will now be described in further details according to the drawings.

Figure 2:
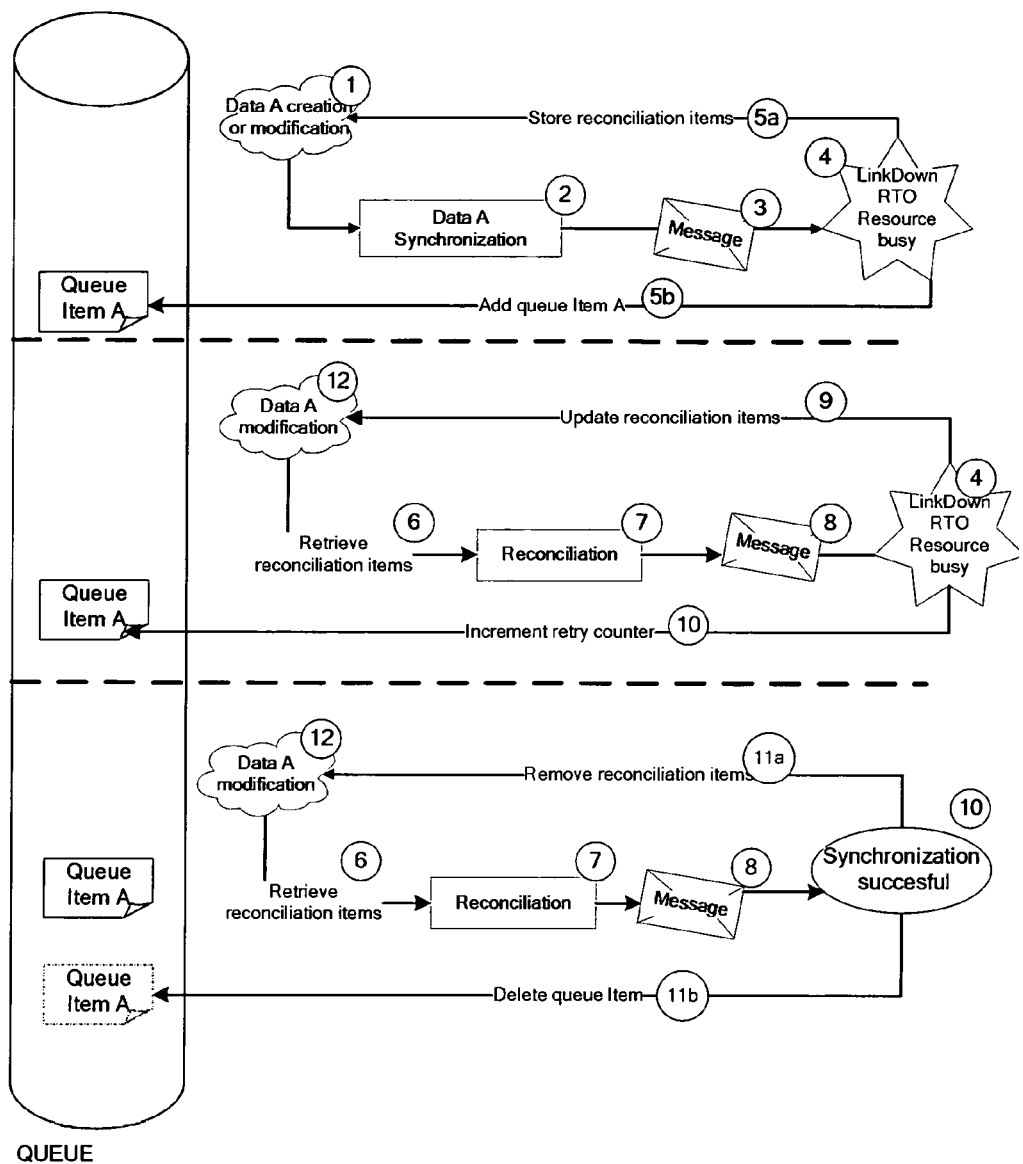
Figure 3:
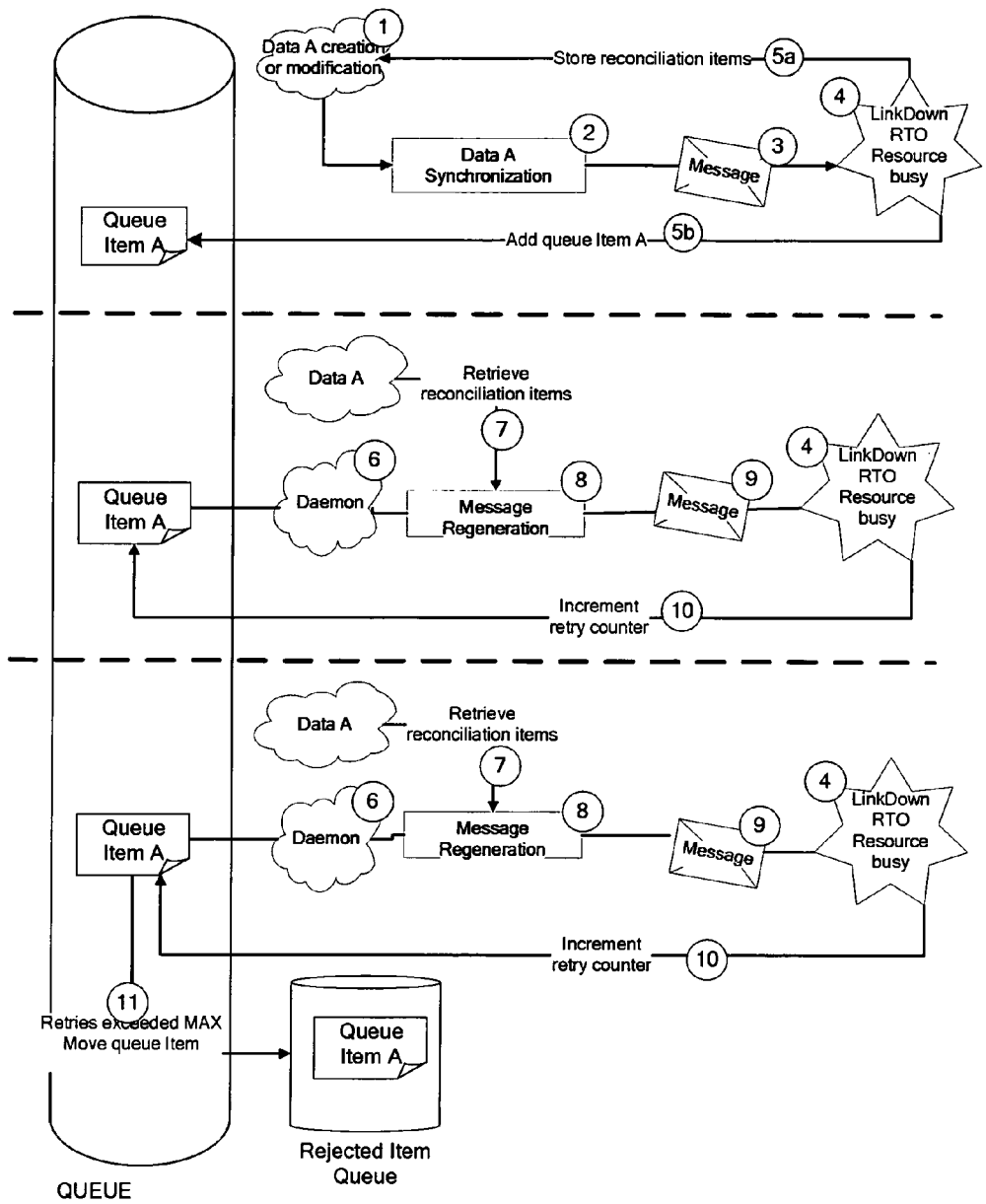

FIG. 1 shows a schematic view of the invention process without subsequent modification on the data, ended by a successful synchronization FIG. 2 shows a schematic view of the invention process with subsequent modification on the data, ended by a successful synchronization FIG. 3 shows a schematic view of the invention process without subsequent modification on the data, ended by an unsuccessful synchronization Before providing a detailed description of the invention, it is recalled that according to an embodiment, the present invention provides a system for data synchronization between two or more computer terminals comprising, at least one client terminal, a server terminal, a communication network connecting said client and server terminals, a data string being created on said client terminal, said client terminal being configured to send the data string to the server terminal for synchronization between the two terminals, characterized in that upon synchronization failure, reconciliation data with the latest synchronization information including said data string, is configured to be stored in a database on the client terminal and resent later.

Optionally, the system according to the invention may comprise any one of the following non limitative features:

In one example the client terminal is a reservation system (RS) and the server terminal is an Airline Inventory System (AIS). In one embodiment the data string includes PNR information.

A synchronization failure includes network errors, online link unavailability, lack of confirmation response from the server terminal, the server terminal being busy.

The stored reconciliation data will always be modified to contain the latest synchronization information. After modification, the stored reconciliation data is placed in a queue containing unsynchronized data.

A daemon is configured to determine if the unsynchronized queued data is eligible for synchronization.

The modification of the reconciliation data is based upon a reconciliation process including adding the modified data string to the original data string, merging the modified data string to the original data string or replacing the original data string by the modified data string.

Furthermore the counter is configured to reinitiate synchronization according to an exponential backoff algorithm.

Finally, the reconciliation data is removed from the database on the client terminal after a successful synchronization with the server terminal.

As an example for FIG. 1 a PNR (Passenger name record) with booking and passenger data is created and committed on the reservation system (1). This triggers a synchronization process (2) and a synchronization message is generated (3). The message contains information about the booking itself and the actions on the PNR called transactional information. Synchronization can fail (4) for several reasons. Reasons could be that the sending of the synchronization message fails due to on-line link unavailability, that the message is sent but no confirmation response is received from the server terminal or even that the resource on the server terminal is busy and the server replies with a given error code.

If a synchronization failure is identified, the PNR message gets into a synchronization pending state. The reservation system stores the data in a dedicated database as reconciliation items (5a). Reconciliation items are linked to the PNR and contain information to identify the data that were not yet synchronized and the information that is needed for reconciliation process. A queue item is also added in a dedicated queue (5b). A daemon (6) is set up against a dedicated queue. It analyses each queue item. According to the retry counter and the time stamp of the item, it determines whether synchronization should be triggered. If yes, the reconciliation item is retrieved (7), a message regeneration process (8) builds a synchronization message (9) and sends it again to the server.

If the synchronization was not successful, the retry counter of the queue will be incremented (10). The PNR data remains in the synchronization pending state and the synchronization will then be retried according to an exponential back-off algorithm.

Upon a successful synchronization (11), the reconciliation data and the queue item are removed from the client terminal. The PNR data is not in the synchronization pending state anymore.

To avoid infinite retries, when the maximum number of retries is reached and the synchronization still fails, the queued item is moved to a rejected item queue as on FIG. 3. However the reconciliation item is kept and the PNR data remains in the synchronization pending state. Thus in case of a subsequent modification, for example a subsequent synchronization, the information that is still not synchronized with the server terminal can be reconciled with the synchronization message and resent.

This mechanism ensures that the modifications are sent to the server terminal even though the first attempt fails and no subsequent synchronization is triggered.

Other issues may also rise for example where PNR data is in the synchronization pending state. If no modification of the PNR is introduced then the synchronization continues according to the above and as described in FIGS. 1 and 3.

However, if a modification of the PNR is presented before the synchronization is triggered, then that leads to a second synchronization process shown is FIG. 2.

In fact, each time synchronization is triggered, reconciliation items are stored in the dedicated database. These items are analyzed and compared to the modifications that have been done to the PNR (12) in the current transaction. Based on earlier defined reconciliation rules, a decision is taken deciding if the corresponding item should be added, removed or merged (7) to the content of the synchronization message that will be sent to the server terminal. Thus a synchronization message (8) containing the most recent PNR and all actions not yet synchronized with the server.

Thanks to the reconciliation rules, the client terminal decides the pertinence and the coherence of the message content, so that the message reflects all the information on the server terminal to be synchronized. This way, the logic on the server terminal to handle synchronization failure is fairly reduced.

The invention claimed is:

1. A system for data synchronization between one or more reservation systems and an airline inventory system connected by a communication network, such that the one or more reservation systems are responsible for the data synchronization, the system comprising:
    at least one processor; and
    a memory storing instructions that, when executed by the at least one processor, cause the system to:
    create a first data string at one of the one or more reservation systems, the first data string including information relating to a creation or modification of a passenger name record on the one reservation system;
    in response to the creation of the first data string, trigger a first synchronization attempt between the one reservation system and the airline inventory system;
    in response to the first synchronization attempt being triggered, generate a synchronization message based on the first data string;
    send the synchronization message from the one reservation system to the airline inventory system;
    determine that the first synchronization attempt is unsuccessful; and
    in response to determining that the first synchronization attempt is unsuccessful:
        store, at the one reservation system, reconciliation data that identifies data relating to the passenger name record that is not yet synchronized;
        add a queue item to a first queue;
        trigger one or more additional synchronization attempts based on the queue item and the reconciliation data according to a retry counter;
        in response to one of the one or more additional synchronization attempts being successful, remove the reconciliation data from the one reservation system and the queue item from the first queue; and
        in response to reaching a maximum number of retries:
            move the queue item to a second queue for rejected items,
            after the queue item is moved to the second queue for rejected items, modify the first data string on the one reservation system,
            update the reconciliation data based on the modified data string,
            generate a third synchronization message based on the updated reconciliation data, and
            send the third synchronization message from the one reservation system to the airline inventory system.

2. The system according to claim 1, wherein said first synchronization attempt is unsuccessful because of a reason selected from the group consisting of a network error, online link unavailability, lack of confirmation response from the airline inventory system, and the airline inventory system being busy.

3. The system according to claim 1, wherein the instructions further cause the system to:
    in response to determining that the first synchronization attempt is unsuccessful, place the reconciliation data in a third queue containing unsynchronized data.

4. The system according to claim 3, wherein a daemon is configured to determine if the unsynchronized data in the third queue is eligible for synchronization.

5. The system according to claim 1, wherein prior to the reconciliation data being updated, the reconciliation data includes the first data string, and the instructions cause the system to update the reconciliation data based on the modified data string by causing the system to add the modified data string to the first data string included in the reconciliation data, merge the modified data string to the first data string included in the reconciliation data, or replace the first data string included in the reconciliation data by the modified data string.

6. The system according to claim 1, wherein the instructions that cause the system to trigger one or more additional synchronization attempts based on the queue item and the reconciliation data according to a retry counter comprise instructions that cause the system to:
    initiate the one or more additional synchronization attempts according to an exponential backoff algorithm.

7. A method for data synchronization between one or more reservation systems and an airline inventory system connected by a communication network, such that the one or more reservation systems are responsible for the data synchronization, the method comprising:
    creating, by at least one processor, a first data string at one of the one or more reservation systems, the first data string including information relating to a creation or modification of a passenger name record on the one reservation system;
    in response to the creation of the first data string, triggering, by the at least one processor, a first synchronization attempt between the one reservation system and the airline inventory system;
    in response to the first synchronization attempt being triggered, generating, by the at least one processor, a first synchronization message based on the first data string;
    sending, by the at least one processor, the first synchronization message from the one reservation system to the airline inventory system;
    determining that the first synchronization attempt is unsuccessful; and
    in response to determining that the first synchronization attempt is unsuccessful:
        storing, by the at least one processor and at the one reservation system, reconciliation data that identifies data relating to the passenger name record that is not yet synchronized;
        adding, by the at least one processor, a queue item to a first queue;
        triggering, by the at least one processor, one or more additional synchronization attempts based on the queue item and the reconciliation data according to a retry counter;
        in response to one of the one or more additional synchronization attempts being successful, removing, by the at least one processor, the reconciliation data from the one reservation system and the queue item from the first queue; and in response to reaching a maximum number of retries:
moving, by the at least one processor, the queue item to a second queue for rejected items,
after the queue item is moved to the second queue for rejected items, modifying, by the at least one processor, the first data string on the one reservation system,
updating the reconciliation data based on the modified data string,
generate a third synchronization message based on the updated reconciliation data, and
send the third synchronization message from the one reservation system to the airline inventory system.

8. A computer program product for data synchronization between one or more reservation systems and an airline inventory system connected by a communication network, such that the one or more reservation systems are responsible for the data synchronization, the computer program product comprising:
a non-transitory computer readable storage medium; and
computer readable code stored on the storage medium and that, when executed by at least one processor, causes the at least one processor to:
create a data string at one of the one or more reservation systems, the data string including information relating to a creation or modification of a passenger name record on the one reservation system;
in response to the creation of the data string, trigger a first synchronization attempt between the one reservation system and the airline inventory system;
in response to the first synchronization attempt being triggered, generate a synchronization message based on the data string;
send the synchronization message from the one reservation system to the airline inventory system;
determine that the first synchronization attempt is unsuccessful; and in response to determining that the first synchronization attempt is unsuccessful:
store, at the one reservation system, reconciliation data that identifies data relating to the passenger name record that is not yet synchronized,
add a queue item to a first queue;
trigger one or more additional synchronization attempts based on the queue item and the reconciliation data according to a retry counter;
in response to one of the one or more synchronization attempts being successful, remove the reconciliation data from the one reservation system and the queue item from the first queue; and
in response to reaching a maximum number of retries:
move the queue item to a second queue for rejected items,
after the queue item is moved to the second queue for rejected items, modify the first data string on the one reservation system,
update the reconciliation data based on the modified data string,
generate a third synchronization message based on the updated reconciliation data, and
send the third synchronization message from the one reservation system to the airline inventory system.

9. The method according to claim 7, wherein triggering the one or more additional synchronization attempts based on the queue item and the reconciliation data according to the retry counter comprises:
determining, by a daemon, if the queue item is eligible for synchronization; and
in response to the daemon determining that the queue item is eligible for synchronization:
retrieving the reconciliation data;
generating a second synchronization message based on the retrieved reconciliation data;
incrementing the retry counter; and
sending the second synchronization message from the one reservation system to the airline inventory system.

* * * * *

UNITED STATES PATENT AND TRADEMARK OFFICE
CERTIFICATE OF CORRECTION

PATENT NO. : 9,396,072 B2
APPLICATION NO. : 13/500672
DATED : July 19, 2016
INVENTOR(S) : Konstantin Sorokin et al.

It is certified that error appears in the above-identified patent and that said Letters Patent is hereby corrected as shown below:

In the Claims:

At column 8, claim number 8, line number 5, change "vet" to --yet--.

Signed and Sealed this
Twenty-third Day of August, 2016

Michelle K. Lee
*Director of the United States Patent and Trademark Office*